United States Patent [19]

Stacey, Jr.

[11] Patent Number: 4,520,601

[45] Date of Patent: Jun. 4, 1985

[54] MECHANICAL FASTENER

[75] Inventor: Albert B. Stacey, Jr., Hampton, Va.

[73] Assignee: The United States of America as represented by the Administrator of the National Aeronautics & Space Administration, Washington, D.C.

[21] Appl. No.: 539,230

[22] Filed: Oct. 7, 1983

Related U.S. Application Data

[63] Continuation of Ser. No. 392,095, Jun. 25, 1982, abandoned.

[51] Int. Cl.³ .................... E04G 21/12; E04C 5/12
[52] U.S. Cl. .................. 52/127.7; 52/745; 52/506; 411/103; 411/108; 244/158 A
[58] Field of Search ............. 411/103, 108, 109, 113, 411/111; 244/158 A, 158 R; 52/745, 127.7, 506

[56] References Cited

U.S. PATENT DOCUMENTS

| | | | |
|---|---|---|---|
| 2,210,441 | 8/1940 | Bachman | 52/297 |
| 2,391,792 | 12/1945 | Miles et al. | 52/513 |
| 2,782,883 | 2/1957 | Rosan | 52/705 |
| 2,799,899 | 7/1957 | Chadwick | 52/511 |
| 2,857,950 | 10/1958 | Tingley | 411/103 |
| 2,945,653 | 7/1960 | Atkin | 244/119 |
| 2,980,155 | 4/1961 | Waller et al. | 411/103 |
| 3,130,940 | 4/1964 | Erb et al. | 244/158 A |
| 3,160,188 | 12/1964 | Frank | 411/103 |
| 3,332,182 | 7/1967 | Mark | 52/127.12 |
| 3,434,262 | 3/1969 | Lawrence | 52/506 |
| 3,579,942 | 5/1971 | Cole | 52/615 |
| 3,778,957 | 12/1973 | Appleberry | 52/511 X |
| 3,936,927 | 2/1976 | Schneider | 244/163 X |
| 4,109,429 | 8/1978 | Whisson | 52/122 |
| 4,137,681 | 2/1979 | Pasley | 52/127.12 |

Primary Examiner—James L. Ridgill, Jr.
Attorney, Agent, or Firm—Howard J. Osborn; John R. Manning; Wallace J. Nelson

[57] ABSTRACT

A device for fastening a temporary replacement heat shield tile to the strain isolation pad of a space vehicle is disclosed. An internally threaded, flanged cylinder 20 is rotatably connected to a threaded brass plug 18 through a flanged aluminum sleeve 16 to form the device. The device is adhesively attached to the replacement tile 12 before using. In using the device, the tile containing the device is placed against the strain isolation pad 14 of the space vehicle such that the flanged portion of the flanged cylinder rests against the strain isolation pad. This flanged portion, which consists of a plurality of 'L' shaped blades 41–44, is then rotated into the strain isolation pad. The brass plug is then rotated with respect to the flanged stainless steel cylinder to draw the tile snuggly against isolation pad and thus complete the fastening process.

10 Claims, 10 Drawing Figures

MECHANICAL FASTENER

ORIGIN OF THE INVENTION

The invention described herein was made by an employee of the United States Government and may be manufactured and used by or for the Government for governmental purposes without the payment of any royalties thereon or therefor.

This application is a continuation of application Ser. No. 392,095, filed June 25, 1982, now abandoned.

BACKGROUND OF THE INVENTION

This invention relates to improvements in mechanical fasteners, and more particularly concerns a mechanical fastener for attaching ablation tiles to the strain isolation pad outer covering of space vehicles while in outer space.

Space vehicles which exit and re-enter the Earth's atmosphere must be protected against the great heat which is generated by such travel. Vehicles such as the Space Shuttle use an outer layer of ceramic tiles attached to an inner layer of strain isolation pad for such protection. Often some of these ceramic tiles are damaged when the space vehicle leaves the Earth's atmosphere. In order to prevent having a vulnerable spot in the vehicle's heat proof covering these damaged tiles must be replaced before the vehicle re-enters the Earth's atmosphere. The present invention provides a convenient method of attaching replacement tiles to the strain isolation pad while the vehicle is in outer space.

The need to replace heat shield tiles on a vehicle in outer space came about only recently when the Space Shuttle was conceived. To date, there has been no standard method for attaching replacement tiles. Adhesives are generally ineffective in outer space because the absence of atmosphere prevents the adhesive from setting. Therefore, a mechanical fastener of some type must be used. Such a mechanical fastener must have sufficient strength to hold the replacement tile in place as the vehicle re-enters the atmosphere. It must also be of the type that facilitates quick, easy installation of replacement tiles by a space-suited astronaut in outer space. The present invention was designed with these constraints in mind.

Existing mechanical fasteners typically require use of a prefabricated socket in the attachment surface which is to receive an insert portion of the fastener. A threaded aperture in an attachment surface which receives a bolt to connect an object to the attachment surface is a simple example of this type fastener. However, a fastener utilizing a prefabricated socket cannot be used to attach a replacement tile to a spacecraft strain isolation pad because it is not known beforehand where the socket will be needed. Therefore a fastener that is capable of attaching a replacement tile directly to a strain isolation pad is needed. Although fasteners of this type do exist, no such existing fastener is entirely suitable for the stated purpose. For example, screws with various type threads are available. However, screws are not adjustable in length and require repeated rotation to fasten. Since replacement tiles might be of various thickness, a fastener which is adjustable in length is desirable. Also, since an astronaut will have to use the fastener while in outer space, the fastener should be one which requires very little manual manipulation. Therefore, a one-piece screw type fastener is not appropriate for the desired use.

It is therefore an object of the invention to provide a mechanical fastener for attaching heat shield tiles to the strain isolation pad of a space vehicle while that vehicle is in outer space.

A further object of this invention is to provide a fastener which is easy to use in outer space and yet is of sufficient strength to hold the replacement heat shield tile to the strain isolation pad as the space vehicle re-enters the Earth's atmosphere.

It is still another object of this invention to provide a fastener that holds the replacement tile tight against the strain isolation pad so as to provide maximum heat protection.

Yet another object of this invention is to provide a fastener which is adjustable in length to allow for variation on tile thickness.

BRIEF DESCRIPTION OF THE DRAWINGS

Other objects and advantages of this invention will further become apparent hereinafter and in the drawings in which.

DETAILED DESCRIPTION OF THE INVENTION

Figure 1:
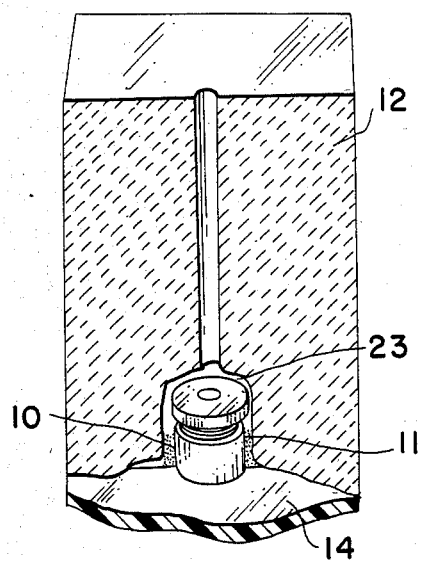
FIG. 1 is a partially cut away cross-sectional view of the present invention being used to fasten an ablation tile to a strain isolation pad.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, and referring to FIG. 1, the number 10 designates generally a mechanical device for fastening an ablation tile 12 which is an object, to a strain isolation pad 14. Strain isolation pad 14 is the material which is used to cover the outer skin of the space vehicle. This pad is composed of a tightly woven nylon fiber. Its purpose is to provide support means and a cushion between the ceramic heat shield tiles and the actual skin of the spacecraft. Such a cushion protects the spacecraft skin when a ceramic tile is damaged. The ablation tile 12 is used to temporarily replace ceramic tiles which are occasionally damaged by intense heat generated as the space vehicle leaves the Earth's atmosphere. These tiles are installed in outer space so as to protect the vehicle against heat upon re-entry into the Earth's atmosphere. The ablation tiles 12 is one which is designed to wear away as the vehicle re-enters the atmosphere and serves to replace the original ceramic tile only until a permanent repair job can be done after landing. The purpose of the present invention is to provide a quick, easy method of fastening ablation tile 12 to strain isolation pad 14 while in outer space, thus the invention can be called a blind side fastener.

Figure 2:
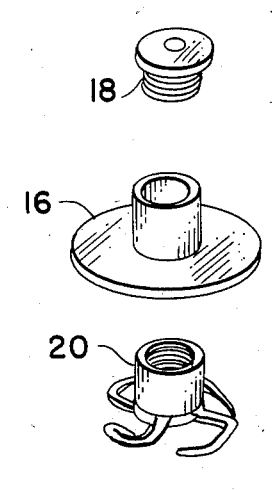
FIG. 2 is an exploded perspective view of a fastener constructed in accordance with the present invention.

Fastening device 10 is comprised of three separate parts: bearing sleeve or means 16, fastening member or means 20, and connecting means or piece 18. Bearing sleeve 16 is a flanged aluminum sleeve; fastening member 20 is an internally threaded flanged cylinder; and connecting piece 18 is an externally threaded brass plug. To assemble fastening device 10, fastening member 20 is inserted into the flanged end of bearing sleeve 16 and connecting piece 18 is inserted into the nonflanged end thereof. Fastening member 20 and connecting piece 18 are then rotatably connected together inside bearing sleeve 16. FIG. 2, an exploded view of device 10, shows how parts 16, 18 and 20 fit together. After device 10 is assembled, the outer portion of bearing sleeve 16 is adhesively attached or bonded to the ablation tile to be used by an adhesive 11. At this point, the fastening device 10 is ready to be used to connect the ablation tile to the vehicle's strain isolation pad.

Figure 3:
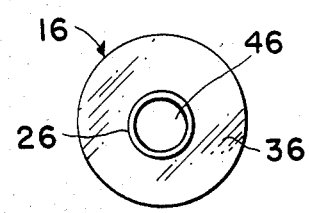
FIG. 3 is a plan view of the bearing sleeve member of the invention.
Figure 4:
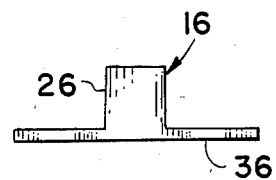
FIG. 4 is an elevational view of the bearing sleeve member of the invention.

In more detail, bearing sleeve 16 (FIGS. 3 and 4) is an aluminum sleeve comprised of a cylindrical portion 26 and a solid flange portion 36. The smooth inner surface of cylindrical portion 26 forms aperture 46. Bearing sleeve 16 is shown in plan view and in elevational view in FIGS. 3 and 4, respectively.

Figure 7:
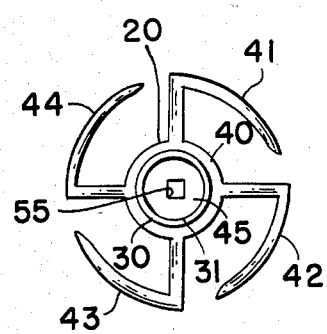
FIG. 7 is a plan view of the fastening member of the present invention.
Figure 8:
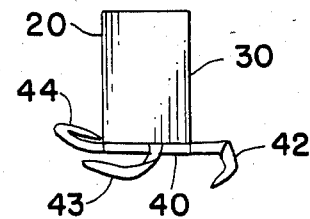
FIG. 8 is an elevational view of the fastening member of the present invention.

Fastening member 20 (FIGS. 7 and 8) is a flanged, stainless steel cylinder consisting of a flanged base portion 40, formed integral with a cylindrical portion 30. Cylindrical portion 30 has a threaded inner surface 31. Flanged base portion 40 is a machined piece including four 'L' shaped and angled grasping blades 41, 42, 43 and 44 projecting from a circular center portion 45 which is perforated by a square hole 55 at its center.

Figure 5:
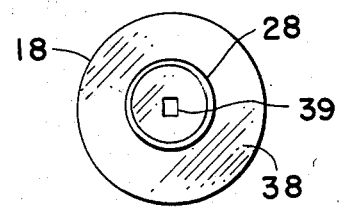
FIG. 5 is a plan view of the connecting piece member of the present invention.
Figure 6:
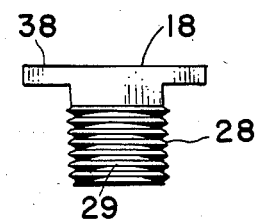
FIG. 6 is an elevational view of the connecting piece member of the invention.

Connecting piece 18 (FIGS. 5 and 6) is an externally threaded brass plug which consists of a cylindrical portion 28 having a threaded outer surface 29, and a flanged top portion 38. Flanged top portion 38 is circular and has a square hole 39 at its center. The size of hole 39 is identical to that of previously mentioned hole 55. The diameter of circular top portion 38 is identical to the diameter of previously mentioned cylindrical portion 26 of bearing sleeve 16.

OPERATION OF THE INVENTION

Figure 9:
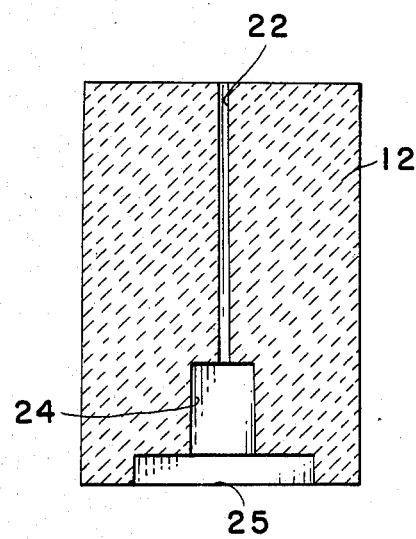
FIG. 9 is a cross-sectional view of an ablation tile prepared for use with the present invention.
Figure 10:
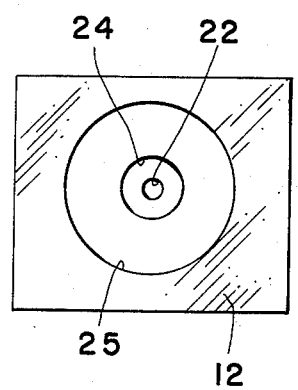
FIG. 10 is a plan view of an ablation tile prepared for use with the present invention.

In order to use fastening device 10 to attach ablation tile 12 to strain isolation pad 14, device 10 must be assembled and adhesively attached to ablation tile 12 as described earlier. Ablation tile 12 must be predrilled so that bearing sleeve 16 fits inside it as if it were countersunk. FIGS. 9 and 10 show a properly prepared ablation tile 12 containing holes 22, 24 and 25. To so prepare ablation tile 12 requires that hole 24 which is slightly greater in diameter than cylindrical portion 26 of bearing sleeve 16 be drilled in the center of previously drilled hole 25 which is slightly greater in diameter than flanged portion 36 of bearing sleeve 16. Hole 24 and 25 are drilled deep enough to allow the entire device 10 to be inserted therein so that blades 41, 42, 43 and 44 of fastening member 20 are completely concealed by tile 12. The depth of hole 24 is somewhat greater than the length of cylindrical portion 26 of bearing sleeve 16 so that a space 23 exists after cylindrical portion 26 is inserted into hole 24. This space 23 provides sufficient room for the manipulation of connecting piece 18 during the fastening process. Also, a relatively small diameter hole 22 must be drilled entirely through the remainder of the ablation tile 12 at the center of hole 24.

After fastening device 10 is adhesively attached to ablation tile 12, hole 39 in flanged top 38 of connecting piece 18 is aligned with hole 55 in base portion 40 of fastening member 20. Holes 39 and 55 are both also aligned with ablation tile hole 22. Bearing sleeve 16 is stationary with respect to ablation tile 12 while the rotatably connected fastening member 20 - connecting piece 18 combination, is movable with respect thereto. The flanged top portion 38 of connecting piece 18 is supported by cylindrical portion 26 of bearing sleeve 16.

In using fastening device 10 to attach ablation tile 12 to strain isolation pad 14 the device-tile assembly is placed against the strain isolation pad to which it is to be attached. An attachment tool, which consists of a handle and a small rod which has been squared for a short distance at the end, is then inserted through the small hole 22 in the top of the ablator tile 12 down into the square hole 39 in the connecting piece 18. The piece is then unscrewed from fastening member 20 until blades 41, 42, 43 and 44 rest against strain isolation pad 14 and flanged top portion 38 of connecting piece 18 is moved away from cylindrical portion 26 of bearing sleeve 16 filling in space 23. The attachment tool is then inserted further through hole 39 until it engages hole 55 in base portion 40 of member 20. A 90° turn of the attachment tool makes the sharpened blades 41, 42, 43 and 44 puncture and/or bite into and grasp the strain isolation pad 14. This motion simultaneously connects blades 41, 42, 43 and 44 to strain isolation pad 14 and draws flanged top portion 38 of connecting piece 18 toward cylindrical portion 26 of bearing sleeve 16. The attachment tool is then withdrawn until it engages only hole 39 of piece 18. Piece 18 is then rotated so that threaded portion 29 of piece 18 is screwed further into threaded portion 31 of fastening member 20. As a result top portion 38 of connecting piece 18 is brought into contact with cylindrical portion 26 of bearing sleeve 16. Further rotation of piece 18 in the same direction causes base portion 38 to put pressure on cylindrical portion 26 of bearing sleeve 16 thus forcing the adhesively connected bearing sleeve 16-ablation tile 12 combination to move toward the strain isolation pad 14 until tile 12 is snuggly abutting strain isolation pad 14. A further slight rotation of piece 18 locks bldes 41, 42, 43 and 44 into place in the strain isolation pad 14 thus completing the fastening operation. From the above description it is readily apparent that this is a blind side procedure that takes place only from the tile side.

The advantages of the present invention are numerous. Although this invention is especially adapted for use in attaching replacement heat shield tiles to the strain isolation pad of vehicles in outer space, it would prove equally useful in making any attachments in an adverse environment. The major advantage of the present invention is that it is easy to use under adverse conditions. Another advantage is that the present invention forms a tight, strong connection of the fastened objects.

Another advantage of the present invention is that it provides a fastener which is adjustable in length.

Yet another advantage of the present invention is that it is a simple device and therefore relatively inexpensive to produce.

It is to be understood that the form of the invention herewith shown and described is to be taken as a preferred embodiment. Various changes may be made in the shape, size and arrangement of parts. Equivalent elements may be substituted for those illustrated and described herein and certain features of the invention may be utilized independently of the use of other features, all without departing from the spirit or scope of the invention as defined in the subjoined claims. For example, the 'L' shaped grasping blades might be replaced by a structure with a different configuration or the fastening member might be attached to the connecting piece by another means which still permits the distances between the pieces to be varied. These and other variations and modifications of the present invention will be readily apparent to those skilled in the art in light of the above teachings.

What is claimed as new and desired to be secured by Letters Patent of the United States is:

1. A device for blind side fastening an object to a supporting member comprising:
   a supporting member;
   an object to be placed flush against said supporting member, fastenable thereto in place from the object side only;
   fastening means having structure for puncturing, biting into and adhering to said supporting member distal to the axis of rotation of said fastening means and for forming an ingress within said supporting member upon rotation with respect thereto;
   bearing means bonded to said object; and
   connecting means for directly engaging said fastening means with said bearing means, whereby said fastening means, said bearing means and said connecting means are operable to draw said object into contact with said supporting member to securely fasten said object to said supporting member in less than one rotation of said fastening means.

2. A device for fastening an object to a supporting member as in claim 1 in which said bearing means is a flanged sleeve.

3. A device for fastening an object to a supporting member as in claim 1 in which the connecting means for engaging said fastening means with said bearing means includes means for interacting with said fastening means to vary the axial distance between said fastening means and said bearing means.

4. A device for fastening an object to a supporting member as in claim 3 in which said connecting means for engaging said fastening means with said bearing means is a plug having a flanged top.

5. A device for fastening an object to a supporting member as in claim 1 in which the fastening means is a flanged cylinder.

6. A device for blind side fastening an object to a supporting member comprising:
   a supporting member with a penetrable surface;
   an object to be placed against said supporting member and fastened thereto in place from the object side only;
   fastening means having structure for self-inserting, engaging and adhering to said support member, including a cylinder having a plurality of distal angled blades extending from a center portion thereof designed to draw said object into contact with said upport member upon rotation of the fastening means less than one turn thereof;
   bearing means bonded to said object; and
   connecting means directly engaging said fastening means for holding said fastening means to said bearing means, said connecting means being operable to further draw said object into contact with and lock said object to said supporting member.

7. A device for fastening an object to a supporting member as in claim 6 in which the center portion includes a means for manipulating the fastening means to engage the angled blades of said fastening means with said supporting member.

8. A device as in claim 7 in which said object is a tile;
   said supporting member is the strain isolation pad covering the outside of a space vehicle;
   said fastening means is a threaded cylinder having a plurality of 'L' shaped, sharpened blades extending from the center portion thereof;
   said bearing means is a flanged sleeve; and
   said connecting means for holding the fastening means to the bearing means is a threaded plug with a flanged top having a means for manipulating the plug to vary the distance between said fastening means and said bearing means.

9. A device for fastening an object to a supporting member as in claim 8 in which said means for manipulating said plug to vary the distance between said fastening means and said bearing means is a square slot located in the center of said flanged top engageable by a tool to rotate said plug into the threaded cylinder portion of the fastening means; and
   said means for manipulating said fastening means to engage the angled blades of the fastening means with the supporting means is a square slot located in the center of the fastening means center portion engageable by a tool inserted through the square slot in the center of the flanged top of the plug to rotate the fastening means.

10. A method for blind side fastening an object to a supporting member by using a fastening device comprising the steps of:
   providing a supporting member;
   providing an object to be fastened thereto;
   bonding a bearing means to said object;
   juxtaposing a fastening means adjacent to said bearing means;
   providing a connecting means engaging said fastening means with said bearing means enabling displacement therebetween;
   placing and holding said object flush against said supporting member;
   puncturing said supporting member with said fastening means distal to the axis of rotation of said fastening means by rotating said fastening means;
   rotating said fastening means less than one full turn to draw said object to said supporting member; and
   rotating said connecting means to further draw said object into contact with said supporting member to securely fasten said object to said supporting member.

* * * * *